United States Patent
Hickey et al.

(10) Patent No.: US 10,503,535 B1
(45) Date of Patent: Dec. 10, 2019

(54) REQUIREMENTS BASED PERFORMANCE MONITORING FOR VIRTUAL MACHINE NETWORKS

(71) Applicant: EMC IP Holding Company LLC, Hopkinton, MA (US)

(72) Inventors: Charles Hickey, Aptos, CA (US); Manivannan Chithirasen, Santa Clara, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 245 days.

(21) Appl. No.: 15/649,619

(22) Filed: Jul. 13, 2017

(51) Int. Cl.
*G06F 9/45* (2006.01)
*G06F 9/455* (2018.01)
*G06F 3/06* (2006.01)
*G06F 11/30* (2006.01)
*G06F 11/32* (2006.01)
*G06F 11/34* (2006.01)

(52) U.S. Cl.
CPC .......... *G06F 9/45558* (2013.01); *G06F 3/067* (2013.01); *G06F 3/0613* (2013.01); *G06F 3/0659* (2013.01); *G06F 11/301* (2013.01); *G06F 11/3006* (2013.01); *G06F 11/328* (2013.01); *G06F 11/3409* (2013.01); *G06F 2009/45591* (2013.01)

(58) Field of Classification Search
CPC .. G06F 9/45558; G06F 3/0613; G06F 3/0659; G06F 3/067; G06F 11/3006; G06F 11/301; G06F 11/328; G06F 11/3409; G06F 2009/45591
See application file for complete search history.

(56) References Cited

U.S. PATENT DOCUMENTS

| | | | |
|---|---|---|---|
| 9,009,742 B1* | 4/2015 | Fair ..................... | G06F 3/0664 719/330 |
| 9,361,302 B1* | 6/2016 | Mao ..................... | G06F 11/14 |
| 2008/0221959 A1* | 9/2008 | Ganapathy ....... | G06Q 10/06311 705/7.37 |
| 2011/0142053 A1* | 6/2011 | Van Der Merwe ..... | H04L 47/72 370/395.1 |
| 2016/0011816 A1* | 1/2016 | Aizman ................ | G06F 3/0604 711/117 |

* cited by examiner

*Primary Examiner* — Henry Tsai
*Assistant Examiner* — John B Roche
(74) *Attorney, Agent, or Firm* — Staniford Tomita LLP (57) ABSTRACT

Embodiments are directed to a requirements-based performance monitor (RBPM) that presents users, through a command line interface or graphical user interface, with a single number in the range of 1-100% and/or a color-coded indicator that allows users to readily tell if the I/O needs of their primary applications in a virtualized computing system are being sufficiently satisfied. The RBPM takes into account both device latency, throughput, IOPS, and slow I/O measurements and primary application requirements. The process uses detailed device latency tables for each device to allow a user to find the particular device and time that performance degradation occurred.

20 Claims, 6 Drawing Sheets

| Metric | What it measures | Typical HDD Range | Variance |
|---|---|---|---|
| IOPS | Input and Output operations Per Second. For example, completing one request every second would be 1 IOPS | 100-150 | Are the I/O's being counted big, medium or small? |
| Throughput | The amount of data moved in a second in mega-bytes per second | 100-200 MB/Sec | A few big operation or lots of small ones? |
| Latency | The average response time per request | 8-15 milliseconds | Big/small/random or sequential |

FIG. 3

INGEST IOPS, THROUGHPUT, LATENCY, SLOW I/O MEASURES
402

↓

PRODUCE SUMMARY PERFORMANCE SCORE FOR DIFFERENT DURATIONS OVER A DEFINED PERIOD
404

↓

GENERATE REPORT METRICS BASED ON APPLICATION REQUIREMENTS TABLE
406

↓

PRESENT TOTAL AMOUNT OF DATA MOVED ALONG WITH PERFORMANCE SCORE FOR PROBLEM DIAGNOSIS
408

REQUIREMENTS BASED PERFORMANCE MONITORING FOR VIRTUAL MACHINE NETWORKS

TECHNICAL FIELD

This invention relates generally to virtual machine networks, and more specifically to a performance monitoring process that accounts for application requirements and device latencies.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The virtualization of computing resources through the use of hypervisors like VMware's ESXi, Linux KVM, and Microsoft's Hyper-V allow users to multiply the value of their hardware investments by running several copies of popular operating systems (OS), such as Windows and Linux at the same time. This increased utilization, however, leads to the persistent problem of achieving and maintaining an acceptable level of performance. Indeed, VMware has stated that the majority of the calls into their support centers are performance related so detecting and preventing these issues is critical to the success of any product targeting these environments.

To deal with this issue, hypervisor vendors have provided a rich set of tools for analyzing performance on their platforms. Guest operating systems, such as the EMC Data Domain Virtual Edition (DDVE), also have scores of indicators. In the hands of a skilled analyst familiar with operational characteristics of both the platform and the application all this data can result in a successful resolution. Many users, however, would prefer to dispense with all these features and instead have an easier way to find out if things are working correctly and the cause of any potential or real problem.

What is needed, therefore is a monitoring process and user interface that quickly and clearly shows users whether or not the I/O needs of their applications are sufficiently satisfied in virtualized computing systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Virtual Edition, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
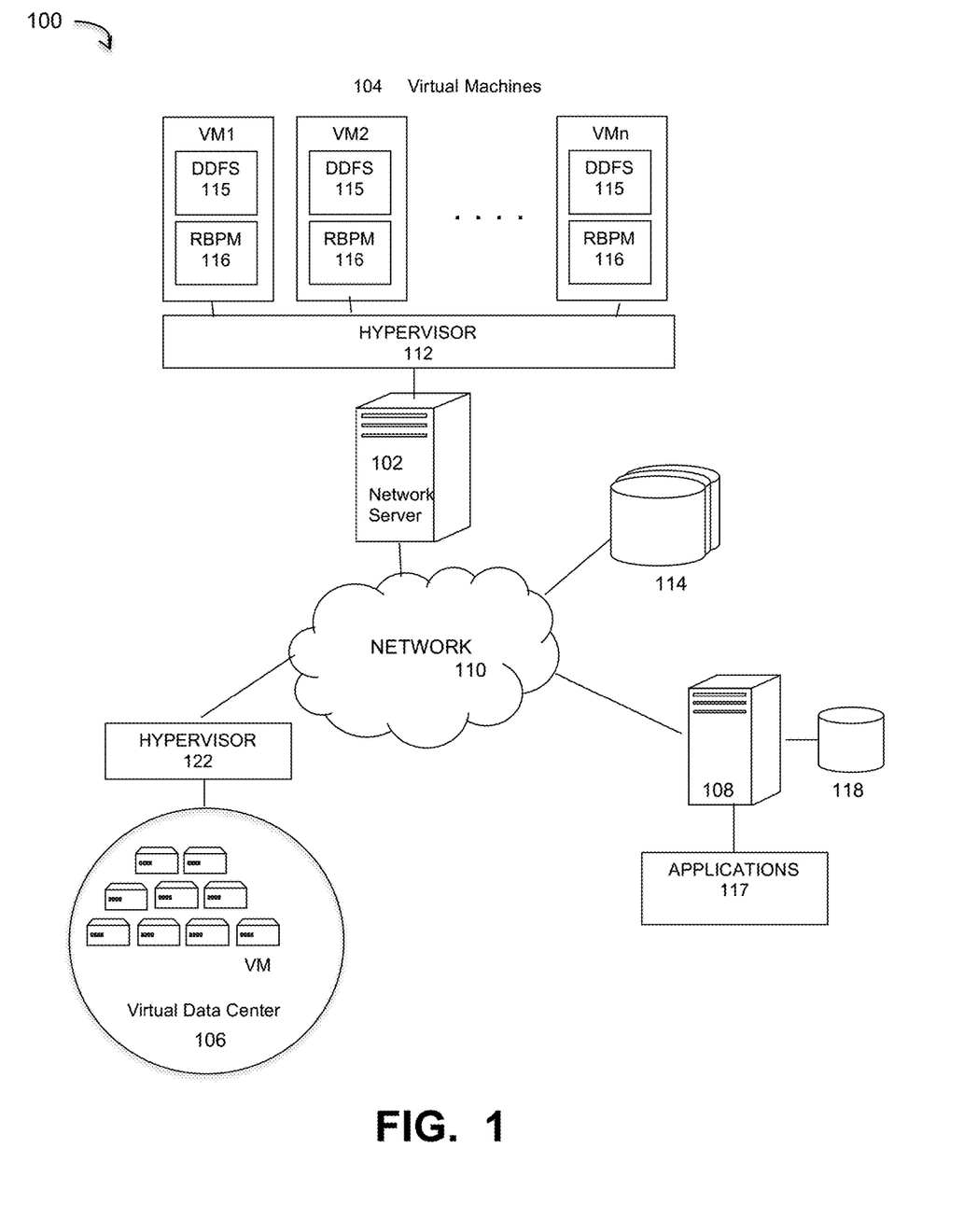
FIG. 1 illustrates a computer network system 100 that implements one or more embodiments of a requirements-based performance monitoring (RBPM) process.

For the embodiment of FIG. 1, network server and client computers are coupled directly or indirectly to one another through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

Virtualization technology has allowed computer resources to be expanded and shared through the deployment of multiple instances of operating systems and applications run virtual machines (VMs). A virtual machine network is managed by a hypervisor or virtual machine monitor (VMM) program that creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating systems may share the virtualized hardware resources. For example, different OS instances (e.g., Linux and Windows) can all run on a single physical computer.

In an embodiment, system 100 illustrates a virtualized network in which network server 102 runs a hypervisor program 112 that supports a number (n) VMs 104. Network server 102 represents a host machine and target VMs (e.g., 104) represent the guest machines. Target VMs may also be organized into one or more virtual data centers 106 representing a physical or virtual network of many virtual machines (VMs), such as on the order of thousands of VMs each. These data centers may be supported by their own servers and hypervisors 122.

The data sourced within the network by or for use by the target VMs may be any appropriate data, such as database data that is part of a database management system. In this case, the data may reside on one or more hard drives (118 and/or 114) and may be stored in the database in a variety of formats (e.g., XML or RDMS). For example, computer 108 may represent a database server that instantiates a program that interacts with the database. One or more servers 108 may also run any appropriate application program 117 that creates, processes, or ingests data within system 100, and an operator of such a server computer may be referred to as a "user."

The data generated or sourced in system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

As stated above, virtualization allows users to run several copies of operating systems and applications at the same time, but this typically comes at a significant cost to system performance. Performance problems are often challenging on "bare-metal" systems, but are vastly more difficult on virtual systems like VMware and Hyper-V due to the creation of virtual-disks drawn from a varied composite of underling physical devices. Maintaining minimum performance requirements in a virtual system and communicating such performance levels is critical to the effective operation of present large-scale virtual networks. FIG. 1 illustrates a computer network system 100 that implements one or more embodiments of a requirements-based performance monitoring (RBPM) process 116 that helps monitor and communicate performance levels to users. For the embodiment shown in FIG. 1, each VM 104 (VM1 to VMn) runs its own RBPM process 116. Each VM may also run its own application, which in an example embodiment is shown as a Data Domain File System (DDFS) for a deduplication backup application. It should be noted, however, that embodiments are not so limited and at least a portion of the RBPM 116 or DDFS 115 functions may be executed or supported by components other than the VMs themselves. For sake of description however, the RBPM and DDFS functions are illustrated and explained as being executed within each VM, as shown. Similarly, the term RBPM process and application or DDFS 115 may be described as being a singular process, but should be understood to represent respective processes running inside each VM 104 or even VMs in data center 106, depending on the system configuration.

In general terms, the RBPM process 116 for each VM 104 takes into account application requirements as well as device throughput and latencies, whereas present monitoring systems typically rely only on throughput and latency (i.e., response time) characteristics. The RBPM process 116 is also configured to provide an easily perceivable metric through a command line interface (CLI), graphic user interface (GUI), or other similar visual cue, to allow users to quickly gauge whether or not the I/O needs of their primary application or applications are being met. It should be noted that the term "latency" as used herein means the response time of a device, interface, function, or other component within the network. The terms "latency" and "response time" are intended to be synonymous, unless otherwise noted.

Figure 2:
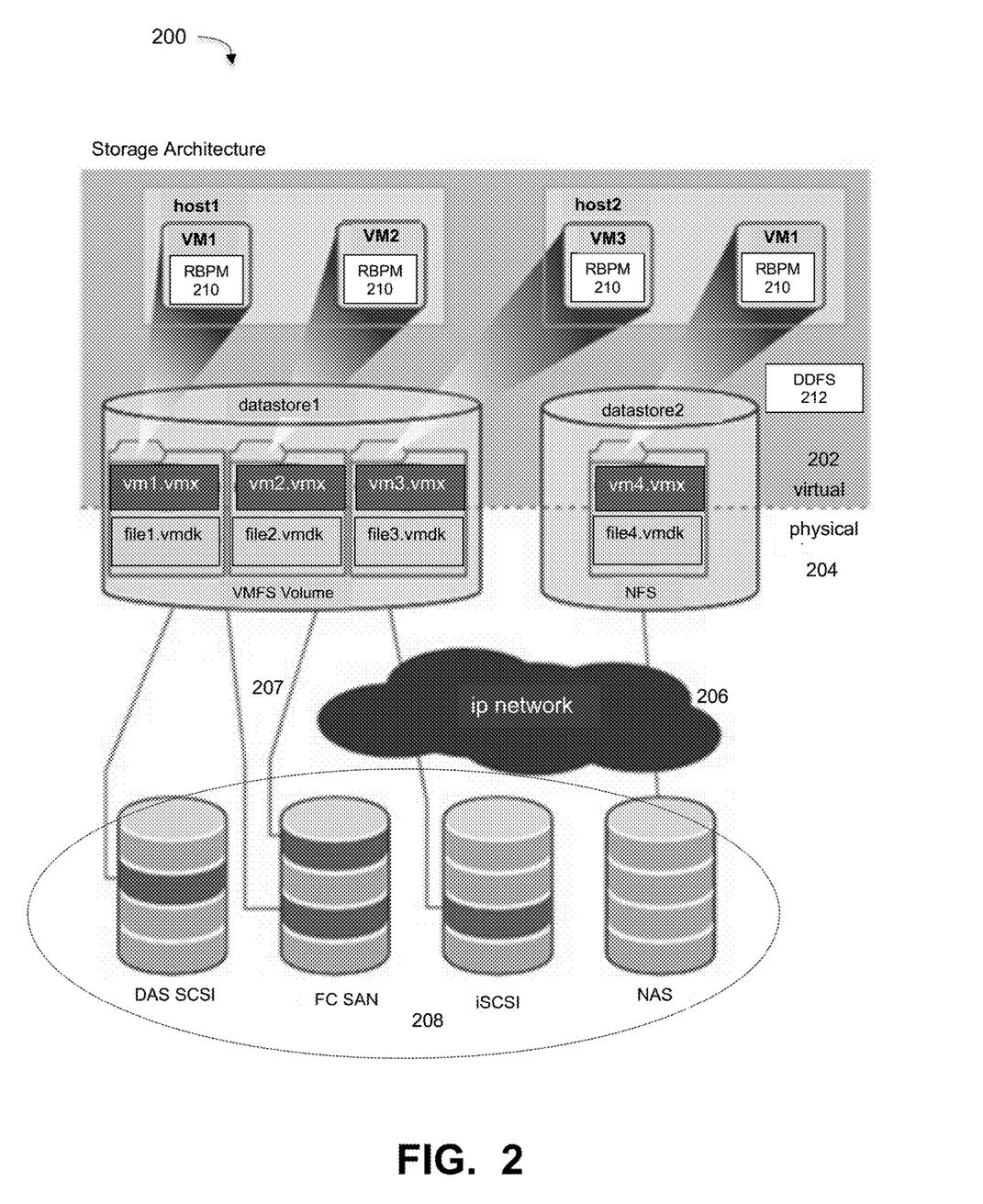
FIG. 2 illustrates a virtual system that implements an RBPM process, under some embodiments.

FIG. 2 illustrates a virtual system that implements a requirements-based performance monitoring process, under some embodiments. The storage architecture system 200 is divided into two realms, the virtual realm 202 and the physical realm 204. The virtual realm 202 contains a number of VMs (e.g., VM1 to VM4) in one or more host machines (e.g., host1 and host2). In system 200, virtual disks can be drawn from directly attached hard disks (i.e. DAS), from clusters of disks remotely accessed via Fiber-Channel (FC), or over the network via iSCSI or NFS protocols that all exist in the physical realm 204. Thus, the network connections can comprise disparate networks 206 and 207, as well as disparate storage devices and media 208. During normal operation and for many different types of applications, this type of architecture can produce vastly different I/O characteristics than simple physical disks, and the sharing of these resources by among various VMs can produce large momentary swings in responsiveness. Such changes in responsiveness can greatly affect the performance of any of the VMs, and requires sophisticated tools to diagnose the root cause of any lapses in responsiveness.

In an embodiment, each VM (VM1 to VM4) of system 200 includes a respective RBPM process 210 that monitors device operating parameters and compares these to application requirements to determine whether or not these requirements are being met. The device operating parameters may comprise processing times for any of the devices in the system, such as storage devices (disk, solid-state, etc.), network interfaces (routers, buffers, etc.), processing components, and so on. For the embodiment of FIG. 2, the application is illustrated as DDFS 212, which is shown as running in the virtual realm 202, but which may actually be run within each VM as shown in FIG. 1.

Figure 3:
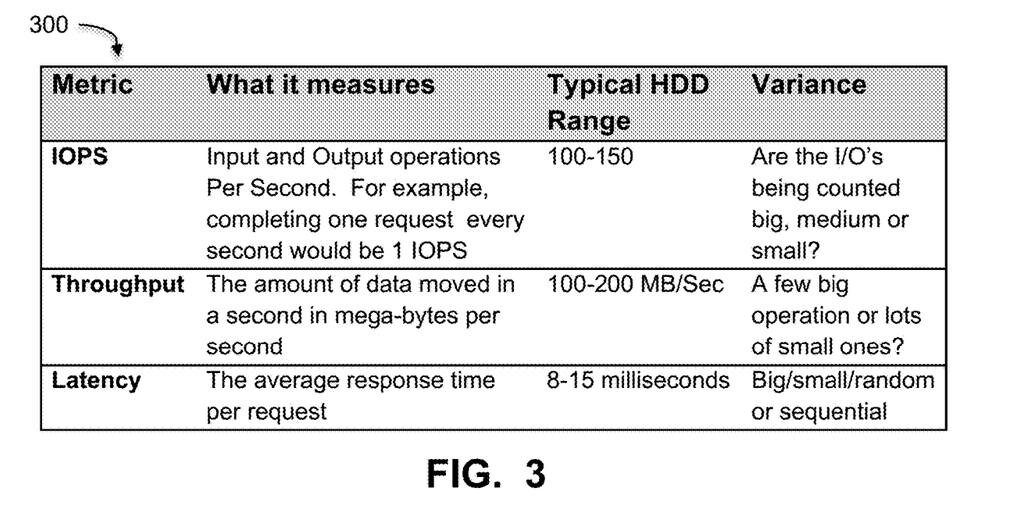
FIG. 3 is a table that lists the performance metrics and representative values for an example device in a system utilizing an RBPM process, under some embodiments.

With respect to measuring device performance, three metrics are typically used to evaluate the performance of I/O devices such as hard-disks, solid state drives, and network interfaces: throughput, IOPS and latency. FIG. 3 is a table that lists the performance metrics and representative values for an example device in a system utilizing an RBPM process 116, under some embodiments. As shown in table 300 of FIG. 3, the IOPS metric is a measure of I/O operations per second and is typically in the range of 100 to 500 for an example hard disk drive (HDD) device. The throughput metric is the amount of data moved in one second in megabytes (MB) per second, and is typically in the range of 100 to 200 MB/second for the example HDD. The latency is the average response time per request, and is typically in the range of 8 to 15 milliseconds for the example HDD.

In present systems, the IOPS/throughput/latency data is collected on intervals ranging from seconds to hours, obtaining the data is relatively inexpensive from a resource standpoint. In all cases these numbers are the mean of thousands of transactions, and though often complemented with minimum, maximum, and standard-deviation values, are presently devoid of detail due to averaging. In general, there are several difficulties when using the standard metrics to assess the health of a running system. Since the overall system is essentially a producer-consumer relationship between the primary application and the platform it is often hard to know which party is to blame when things slow down. That is, one should know whether the system is really getting slower, or whether simply less work is being presented for the system to perform. This problem is particularly acute when it comes to evaluating the performance of deduplicating file system, such as DDFS 115, as DDFS is essentially just a server responding to NFS requests from remote clients (such as VMs in data center 106), and low throughput can simply be the result of the clients sending less data.

In general, the latency metric (also called the response time metric), when properly collected provides the closest thing to a heartbeat measuring the health of the underlying device. If the device suddenly starts taking longer to process the same requests then it is likely experiencing some form of degradation. However, the problem with this metric is that requests vary greatly in size (e.g., from less than one kilobyte to 256 kilobytes or more), and large requests obviously take a longer time to complete.

A major issue with performance monitoring using only the data in table 300, is that it is rather difficult to know if the measured numbers indicate a problem or normal operation. That is, it is not enough to just say the latency is too high, or throughput is too low. Only by comparing the data from a device in question to that of a known good device can any meaningful conclusion be made. To make such a comparison, the identical work load, i.e., the pattern of reads/writes, sequential/random, and block sizes, to both a suspect and known-good device must be reproduced so that a meaningful comparison can be made. The RBPM process 116 sidesteps this issue by comparing the I/O performance of the device in question by determining if the performance being provided is sufficient for the primary application.

One major omission in present performance monitoring methods is the absence of accounting for the application requirements. That is, even if it were possible to precisely determine that a particular virtual device has degraded, it might be that the primary application is hardly affected. Ultimately, what matters most is meeting the needs of the primary application, so in an embodiment, the RBPM focuses on the performance requirements of the primary application in addition to the operating characteristics (performances) of the devices. The process precisely specifies the envelope of I/O requirements that the primary application needs, and uses that to score the observed performance statistics of the devices in question. This is done by summarizing the required read and write performance of the application in a tabular way in a form sufficiently complete to cover a wide range of possible workloads. By comparing the measured performance with the requirements table of FIG. 3, the system can determine if the performance being provided is meeting the needs of the primary application. In an embodiment, the process scores the performance on a 1-100% scale and informs users through a user interface (e.g., CLI or GUI) so that they can be kept apprised of the state of the system.

In an embodiment, the user interface comprises a GUI display that includes a numeric percentage value and/or a color-coded display image. In an example embodiment, the color-coded scheme may be a red-yellow-green indicator light that is tied to specific ranges. For example: 90-100 for green, 70-90 for yellow and below 70 for red. This scheme is mentioned as an example and embodiments are not so limited. Different color schemes and ranges can be displayed to provide the appropriate indication of system performance. Other GUI mechanisms may also be used, such as a graph showing the performance score as part of a running display, and so on. The case where the user interface comprises a CLI is described in greater detail below.

The RBPM process scores performance not by an abstract standard, but by the real-time needs of the application while it is in use during normal operation. This helps overcome, or at least counteract certain inherent limitations of performance monitoring. For example, if a host system offers performance parameters greater that the specified envelope then it will always show at or near a 100% grade; high grades will also result if the host system has an inferior performance envelope, but the application at run-time does not push the I/O to the edge of that envelope. Using the RBPM process, if the application pushes the I/O to the maximum level on a deficit system, the performance score will be reduced accordingly, thus giving a more accurate indication of system performance relative to the application's needs.

In an embodiment, the RBPM process uses the standard metrics that might be available through the OS itself (e.g., Data Domain DDVE) along with additional metrics. These might include metrics such as the ratio of random to sequential operations, a count of I/O's taking longer than one second (slow I/Os), and the overall percent of time that the device is busy. In an embodiment, the metrics utilized by the RBPM process comprise the IOPS, throughput, latency and slow I/O measures, though other device/interface specific performance measures are also possible.

Figure 4:
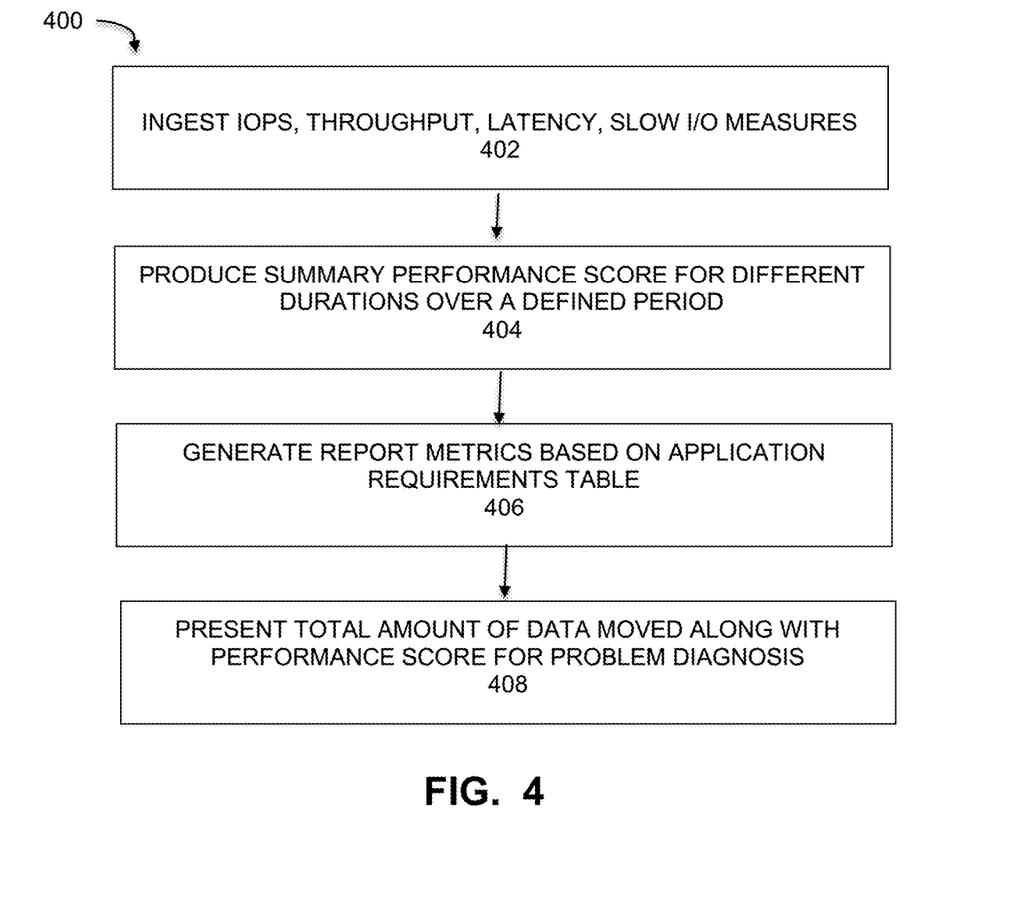
FIG. 4 is a flowchart that illustrates an overall process of performing requirements-based performance monitoring, under some embodiments.

FIG. 4 is a flowchart that illustrates an overall process 400 of performing requirements-based performance monitoring, under some embodiments. The process 400 first ingests an existing flow of per-device IOPS, throughput, latency, and slow-I/O counts, where slow I/O counts are defined as those that take more than one second to complete, block 402. It then produces a summary score on a per-device basis and for the system as a whole over different durations (e.g., 5-minute, 1-hour, 24-hour and weekly durations) for a specified time period, block 404. Each report contains the current, average, and lowest I/O performance-score as a simple percentage ranging from 0-100% over the defined period. This period can be any appropriate period such as several hours, one day, or several days. The reporting metric that is generated is based off a requirements table for that covers a wide range of possible workload permutations, block 406. The process 400 also presents the total amount of data that is moved along with the performance score to enhance the use of this data for problem diagnosis, block 408.

Figure 5:
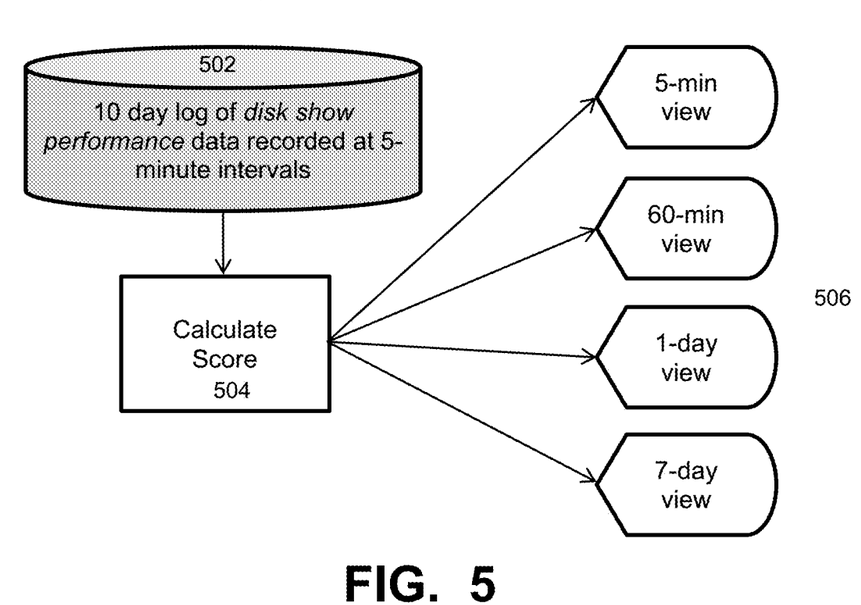
FIG. 5 illustrates a process of calculating the score for the method of FIG. 4, under some embodiments.

FIG. 5 illustrates a process of calculating the performance score (block 402) for the method of FIG. 4, under some embodiments. As shown in FIG. 5, a multi-day log (e.g., 10-day) 502 stores performance data recorded at a certain time interval (e.g., 5-minutes). This data is used to calculate the score, 504, which can then be viewed for different time periods 506, such as 5-minutes, 60-minutes, 1-day, or 7-days. All time parameters shown in FIG. 5 are for illustration only, and embodiments are not so limited. Any appropriate time interval other than 5-minutes can be used for the log 502 and many other different time period 506 may be used instead of or in addition to those shown.

In an embodiment, the RBPM performs a workload address the variance that the guest OS and primary application presents in terms of different workloads in the system, where workload refers to the particular mix of I/O requests made to the system. For example, sequential transfers can occur with much less latency than random ones, large data blocks take longer than small blocks, and reads versus writes or particular mixes of reads/writes add yet another variable. The varying effects of these variables are expressed in a set of (n) tables that approximates to a sufficient degree the needs of the primary application, as used in block 406 of FIG. 4.

Figure 6:
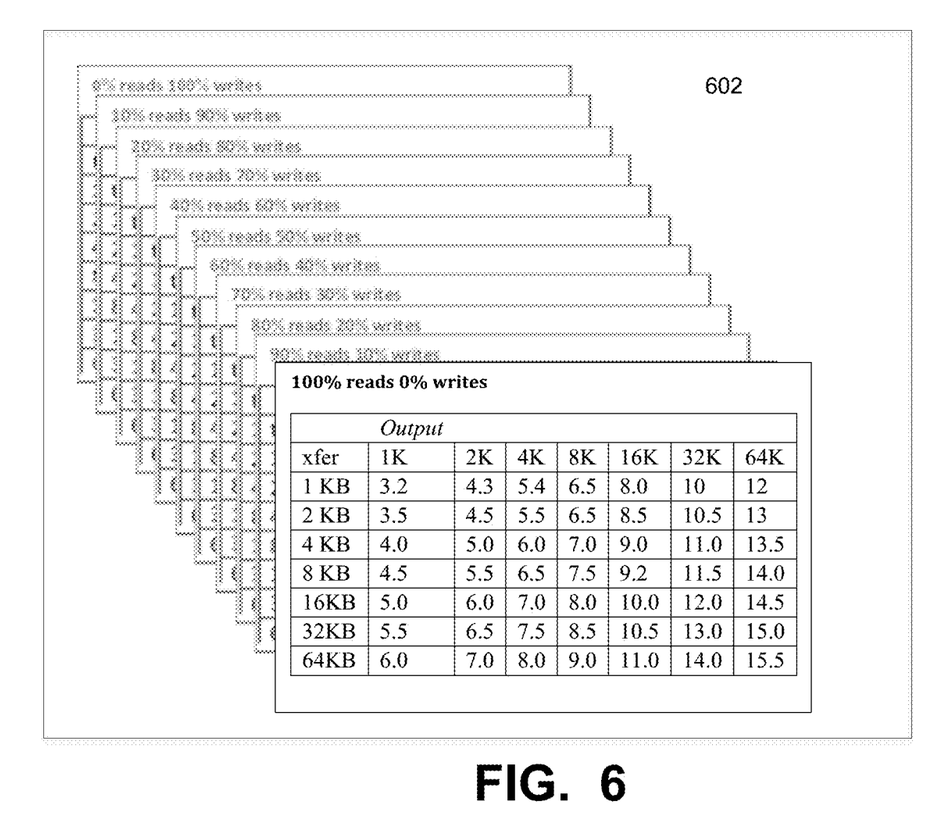
FIG. 6 illustrates the generation and presentation of latency tables in an example embodiment.

FIG. 6 illustrates the generation and presentation of latency tables in an example embodiment. The set 602 of tables in FIG. 6 represent eleven (n=11) read latency tables selected by observed read/write ratio. FIG. 6 shows an example of two sets of tables of latency tables, one for reads and one for writes being constructed for the RBPM process. Each set has ten sub-tables selected by the read/write ratio. The example of FIG. 6 has each table range from 0 to 100 percent of reads against 100 to 0 percent of writes in ten-percent increments. The row of each table is selected by the average throughput; the column is selected by the average transfer (xfer) block size; and the number in each cell is the "target_latency" in milliseconds. If the observed latency is less than or equal to the target the score is 100 percent. It should be noted that the individual tables and arrangement of tables of FIG. 6 are intended for illustration only. The configuration of the tables may be different and generally have more columns and rows than shown. Similarly, the number of tables (n) and percentage increments between the tables can be different. FIG. 6 illustrates example tables for the latency performance metric. Other performance metrics can also be used to generate similar tables, in addition to or instead of any of the present IOPS, throughput, and slow I/Os, metrics.

The use of latency for the tables shown in FIG. 6, indicates that, in general, a key indicator on I/O performance that most affects applications such as deduplication is latency, that is, the amount of time to complete a given request. For example, a DDFS system will generally ride up and down peaks and valleys in latency fairly well, but if a rough patch is hit for a minute or more, this can result in a shut down due to timeouts in the protocols supported by this server. The difficulty with the latency metric is that it varies widely based on the type of device and the workload. For HDD and SSD devices, as well as SAN and NAS devices, latency can vary by a factor of 10000, from hundreds of microseconds to thousands of milliseconds under normal workloads. In addition, I/O devices have various queuing and caching mechanisms (including any caching that the hypervisor might perform) that are of value, but that also produce a wide variance in latency. In any case latency spikes are normal. Continuing the above example, when the DDFS submits a large number of I/O requests, the average latency rises as more I/O's are queued and pending. Setting a trigger on latency is of limited value because under normal conditions, an increase in latency is the result of increased load, which produces an increase in throughput as expected. With all these factors taken into account, each type of I/O device has an envelope of expected latency under load that can be measured and monitored. Similarly, the primary application also has a required envelope of needs, and the required and observed latency and throughput expectations are used by the RBPM process through the performance score metric.

In an embodiment, the mathematic calculation underlying the performance scoring relies on the file system and disk I/O characteristics. The key is to simplify the analysis method as much as possible by using any economies or patterns that are available. For example, the DDFS system, which submits its I/O requests through DD_RAID (a fairly typical RAID6 array of hard disks), ends up generating some distinctive patterns. Writes are done in large sequential blocks of 4.5 MB split into 128K and larger chunks. Reads are generally to random locations and are considerably smaller. Such patterns, along with the observations on the duration of the latency spikes that the DDFS can absorb allows an effective but simple method of characterizing these workload patterns by focusing on the read-to-write ratio.

As shown in FIG. 6, the RBPM process 116 addresses the workload/latency problem by expressing the required performance envelope as a table in a set of n tables that lists, for a given average transfer size and throughput level, the expected latency in microseconds. Since one of the biggest issues affecting the three standard metrics is the variance in transfer size, the process calculates the average transfer size as throughput/IOPS (e.g., a 100 MB/second throughput at 1000 IOPS equals an average transfer size of 1 MB). Accordingly, average transfer sizes (e.g., 1 KB, 2 KB, 4 KB, 8 KB, 16 KB, 32 KB, 64 KB, 128 KB, 256 KB, 512 KB 1 MB, 2 MB, 4 MB, etc.) are expressed in rows in these tables 602. When the average transfer size is smaller, the requests tend to be more random and have higher latencies. Increasing the load on the device increases its throughput, but also pushes up latency, and the latency numbers as reflected in the cells of the table. The additional dimension that is considered is the ratio of reads to writes, which results in the three-dimensional stack of tables of FIG. 6, with the bottom most table being a read/write mix of 0% reads/100% writes, and then increasing by 10% in each layer going up to the top most layer which is 100% reads/0% writes. Since the data is collected during 5-minute (or similar) intervals, the process computes the read-to-write ratio for that period to select the appropriate table, then uses the average request size to select a column and the throughput to select a column, and that yields our expected target-latency. If the observed latency is within that envelope, performance is judged to be running at 100%. If the average response time is greater than that, the score is reduced proportionately.

In an embodiment, the process maintains two separate stacks of tables 602, one for reads and another for writes, and each stack has the 10-high stack of tables that are split by the read-to-write ratio. It might be noted that looking up write data on a table that was 100% reads and 0% writes may not be useful, but due to rounding, 0% writes can actually mean less than 5% writes, and not absolutely zero writes.

Figure 7:
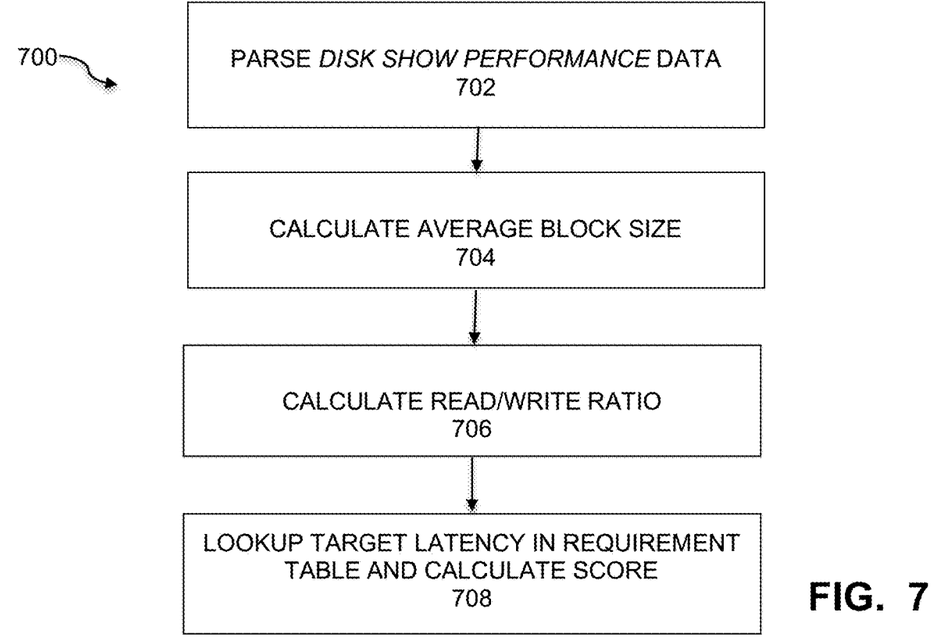
FIG. 7 is a flowchart that illustrates a method of calculating a performance score, under some embodiments.

FIG. 7 is a flowchart that illustrates a method of calculating a performance score, under some embodiments. Process 700 starts with block 702 by parsing the "disk show performance" data into a time stamped records containing read and write data separately that includes the following data items:
a) Throughput
b) IOPS
c) Latency
d) Count of I/O's over 1 second e) Calculate: Average_block_size=throughput/IOPS (block 704)
f) Calculate: read_to_write ratio (block 706) by dividing read throughput by the combined read and write throughput.
g) Score (calculated below)

The process calculates the block size and then calculates the read_to_write ratio, and uses that data along with the throughput to do a table look up in the three-dimensional set of tables 602. It does this twice, once of the read data and again for the write data.

For the read data and write data separately, the process selects the table_latency as follows: (1) use the read_to_write_ratio to select the proper latency table; (2) Index the row by the average block size in kilobytes; and (3) index the column by the throughput in megabytes-per-second. It then divides the table_latency by the parsed latency to produce the score, block 708. If the score is greater than 1, it is set it to 1. The score is reduced by 1% for each I/O taking more than 1-second, and the score is then saved.

Figure 8:
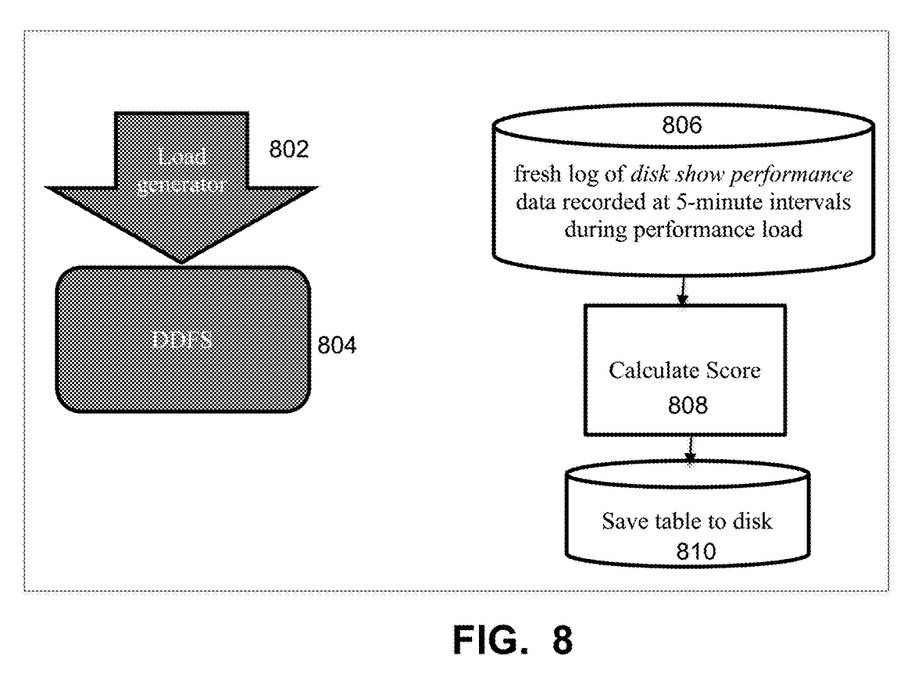
FIG. 8 is a diagram that illustrates a process of generating and saving latency tables, under some embodiments.

In an embodiment, the RBPM process 116 creates its own reference tables by running it on a known good system with a set of expected loads. The latency tables are generated using reference data, and the system that is used as the reference system, as a practical matter, needs thousands of different I/O workloads to populate the thousand cells in the table. In an embodiment, the system sends the process a workload with the exact or near-exact mix of block sizes and throughput loads required. In general, absolute accuracy is not needed since large drops in the score are relevant as opposed to small (2-3%) differences. FIG. 8 is a diagram that illustrates generating latency tables, under some embodiments. As illustrated in FIG. 8, a load generator 802 inputs data to the file system 804. The disk_show_performance data log 806 is used to calculate the score 808, which is then saved as the table to disk, 810.

In an embodiment, the process can extend the scoring methods by factoring additional metrics, including using a point system that reduces the score for I/O errors and timeouts, as well as the number of I/Os that take more than one second to complete. It has been found that these are leading indicators for either a gradual degradation or something that might happen more precipitously.

As shown in FIG. 5, scores are calculated for each device every five minutes, and rolled up in to a system wide number on an hourly, daily, and weekly basis. This allows the user to review and see the performance score of the system in the past (e.g., a day or more ago), and then drill down to the hour and 5-minute period and to the actual device where a degradation was observed. From there the existing tools and stats made available by the hypervisor vendors can be deployed to track down the root cause. The RBPM process thus provides a meaningful tool to find where and when the I/O system dropped below its requisite level of service. Conversely if a performance problem does crop up on a device, the user can quickly determine if slow I/O is the problem.

As stated above, embodiments of the RBPM process include a CLI or GUI user interface to display the performance score. The display can be configured to display data for one device and/or for all devices. For one device that displayed data includes: (1) throughput: the sum of its read and write transfers in bytes, (2) minimum: the lowest performance-score of the read and write scores over the requisite period, (3) average: the throughput-weighted average of the read and write scores; and (4) last: computed as average but covers just the last moment of time span measured (i.e., if the time-span is 5 minutes and samples are every five minutes then average and last are the same, but if the time-span is 1-hour, then last is the average of the last 5-minute sample interval).

For all the devices, the display can include: (1) throughput: the sum of throughputs for all the devices, (2) minimum: the lowest minimum performance-scores of all the devices, (3) average: the throughput weighted performance-scores of all the devices, (4) last: the performance-score of the last interval in the collection being processed (e.g., last 5 minutes in an hour, last hour in a day, last day in a week). Other display elements can be included depending on system configuration and system requirements.

In a detailed display area, the read and write data may be displayed separately. The display can also be tailored to accommodate different displays of data. For example, for an interval greater than 5-minutes, the breakdown of the component time units will be provided, as in 1-hour will show all 12 of the prior 5-minute period, 1-day will show 24 hours worth of data, and 1-week will show 7 days all in columns, and so on.

Any appropriate GUI display or command line interface (CLI) can be used to present the standard metrics with any additional data. For example, it can be extended to allow "summary" and "detailed summary" views of the performance scoring of the already-provided data. An example CLI output of a disk show performance summary may be as follows:

| # disk show performance summary Overall I/O Performance for the last 24 hours: | | | | |
|---|---|---|---|---|
| Devices | Minimum | Average | Current | Throughput |
| all | 97% | 99% | 100% | 1.68 TiB |

A view of individual device performance for the same period looks may be displayed as follows:

| # disk show performance summary detailed Per device I/O Performance for the last 24 hours: | | | | |
|---|---|---|---|---|
| Device | Minimum | Average | Current | Throughput |
| dev1 | 82% | 98% | 96% | 256 MiB |
| dev2 | 72% | 96% | 95% | 50 GiB |
| dev3 | 88% | 96% | 99% | 362 GiB |
| dev4 | 62% | 75% | 76% | 656 GiB |
| dev5 | 72% | 88% | 90% | 970 GiB |

Note that in the above example, dev4 shows a minimum level in the last 24 hours of 62% indicating a possible problem with that device. In a color-coded GUI, this metric would be displayed in red, yellow or green depending on the number, with dev3 likely being displayed in red.

Once a device is suspected of having a problem, a similar interface is used to find the point in time where the problem occurred. This allows the user to drill down on a specific device for an hour-by-hour (or similar time interval) display. This may be displayed as follows:

| # disk show performance summary dev4 interval hourly Last 12 hours performance-score for dev4: | | | | | | | | | | | | |
|---|---|---|---|---|---|---|---|---|---|---|---|---|
| Time-since | 00 | 01 | 02 | 03 | 04 | 05 | 07 | 08 | 09 | 10 | 11 | 12 |
| Minimum | 88% | 98% | 68% | 67% | 58% | 66% | 62% | 52% | 60% | 50% | 42% | 40% |
| Average | 98% | 98% | 78% | 70% | 65% | 78% | 69% | 60% | 71% | 55% | 45% | 42% |
| Throughput (GiB) | 102 | 199 | 99 | 150 | 499 | 222 | 100 | 102 | 155 | 188 | 200 | 211 |

With I/O performance statistics present on the Data Domain system being recorded periodically (e.g., every five minutes), performance-score metrics can be calculated during that same period. Summarizing this in 1-hour, 24-hour and one-week periods is performed as follows. Assume the device scores are as follows:

| Device | Minimum | Average | Current | Throughput |
|---|---|---|---|---|
| dev1 | 99% | 100% | 100% | 100 MiB |
| dev2 | 100% | 100% | 100% | 200 MiB |
| dev3 | 50% | 64% | 100% | 1400 MiB |

The same weighted average method from above would apply to all the percentages. The storage performance for 5-minutes is as follows:

| Minimum | Average | Current | Throughput |
|---|---|---|---|
| 56% | 85% | 100% | 1600 MiB |

For a one-hour calculation per device and system, the average is the weighted average as calculated above. The current is the last 5 minute period. The minimum would be the lowest-average in a 5 minute period.

For a 24-hour calculation per device and system, the average is the weighted average as calculated above. The current is the last 60 minute period. The minimum is the lowest-minimum in a 60 minute period.

For a 7-day calculation per device and system, the average is the weighted average as calculated above. The current is the last 1-days period. The minimum is the lowest-minimum in a 1-day period.

The RBPM process 116 helps to overcome performance-related issues in a virtualized network by allowing a user to look back several days and quickly locate the point in time where performance degraded. Often one will find that another VM has been started or moved to the compute resources that are in-use by the application in question. This helps address a primary source of customer complaints by users in virtual environments, that is, changes in the way resources are shared leading to performance impacts for different users.

System Implementation

Embodiments of the processes and techniques described above can be implemented on any appropriate virtualized system including a backup system operating environment or file system, or network server system. Such embodiments may include other or alternative data structures or definitions as needed or appropriate.

Figure 9:
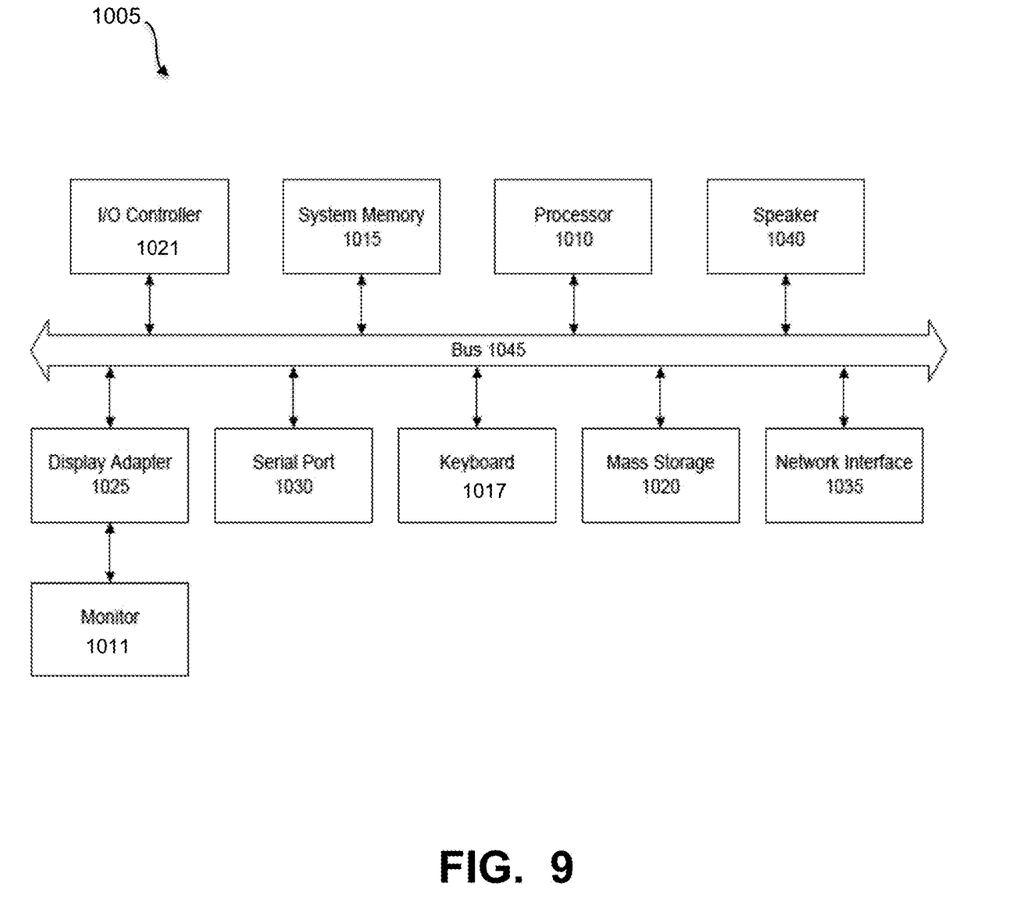
FIG. 9 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is intended to illustrate one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11 n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of measuring performance of an application running in a virtual computer network, comprising:

receiving, for each device of a plurality of devices in the network, an existing flow of device operating parameters;

measuring a performance for each device and the network as a whole over a plurality of durations for a specified time period in terms of the device operating parameters;

analyzing a workload of a primary application of a target device of the plurality of devices in terms of data transfer variables of the primary application to determine an envelope of I/O (input/output) requirements of the primary application, wherein the envelope is expressed as a three-dimensional set of n tables; and producing a summary performance score for each device using measured performance and the envelope of I/O requirements to provide an indication of whether or not a required read/write performance of the primary application is satisfied, wherein the performance score is calculated using data variables comprising device throughput, input/output operations (IOPS), device latency, slow I/O counts exceeding one second, average block size, and read-to-write ratio.

2. The method of claim 1, wherein the the average block size is calculated by dividing the device throughput by the IOPS, and the read-to-write ratio is calculated by dividing a read throughput by a combined read and write throughput, and wherein the envelope of I/O requirements is a table in the set of n tables that lists, for a given average transfer size and throughput level, an expected latency in microseconds.

3. The method of claim 2 wherein the plurality of durations comprises a five-minute view, a 60-minute view, a 1-day view, and a 7-day view, and wherein the specified time period comprises a time period on the order of one to ten days.

4. The method of claim 3 further comprising measuring a total amount of data moved in the network for all devices of the plurality of devices over the specified time period.

5. The method of claim 4 further comprising generating a report containing a current, average, and lowest I/O performance score as a simple percentage within the range of 0 to 100%.

6. The method of claim 1 further comprising summarizing the required read/write performance of the primary application in tabular form to produce a requirements table covering a defined range of possible workloads of the primary application.

7. The method of claim 6 further comprising comparing the measured performance for each device against the requirements table to produce a performance score that provides the indication of whether or not a required read/write performance of the primary application is satisfied.

8. The method of claim 7 further comprising:
expressing the performance score as a percentage score in the range of 0 to 100 percent; assigning a color code to defined sub-ranges in the range; and
displaying the performance score as at least one of a numeric percentage and the color code to a user through a graphical user interface.

9. The method of claim 8 wherein the color code comprises a green display for a range of 90 to 100 percent, a yellow display for a range of 70 to 90 percent, and a red display for a range of 0 to 70 percent.

10. The method of claim 6 wherein the requirements table comprises a number n of latency tables each having a unique mix of read/write operations.

11. The method of claim 10 wherein each table comprises a number of cells, wherein a row of a cell is selected by average throughput and a column of the cell is selected by average transfer block size, and value in the cell represents a target latency in a unit of time.

12. The method of claim 1 wherein the primary application comprises a deduplication backup process executed by a server computer in the network, and which comprises a deduplication backup server running a Data Domain file system (DDFS).

13. An apparatus measuring performance of an application running in a virtual computer network, comprising:
in interface receiving, for each device of a plurality of devices in the network, an existing flow of device operating parameters, the device operating parameters comprising an input/output operations (IOPS) rate, device throughput, device latency, and slow input/output (I/O) counts representing I/O operations exceeding one second in duration;
a processing component measuring a performance for each device and the network as a whole over a plurality of durations for a specified time period in terms of the device operating parameters, analyzing a workload of a primary application of a target device of the plurality of devices in terms of data transfer variables of the primary application to determine an envelope of I/O requirements of the primary application, wherein the envelope is expressed as a three-dimensional set of n tables, and measuring a total amount of data moved in the network for all devices of the plurality of devices over the specified time period; and
a reporting component producing a summary performance score for each device using measured performance and the envelope of I/O requirements to provide an indication of whether or not a required read/write performance of the primary application is satisfied, wherein the performance score is calculated using data variables comprising device throughput, input/output operations (IOPS), device latency, slow I/O counts exceeding one second, average block size, and read-to-write ratio.

14. The apparatus of claim 13 wherein the average block size is calculated by dividing the device throughput by the IOPS, and the read-to-write ratio is calculated by dividing a read throughput by a combined read and write throughput, and wherein the envelope of I/O requirements is a table in the set of n tables that lists, for a given average transfer size and throughput level, an expected latency in microsecond, and further wherein the plurality of durations comprises a five-minute view, a 60-minute view, a 1-day view, and a 7-day view, and wherein the specified time period comprises a time period on the order of one to ten days.

15. The apparatus of claim 14 wherein the processing component generates a report containing a current, average, and lowest I/O performance score as a simple percentage within the range of 0 to 100%, summarizes the required read/write performance of the primary application in tabular form to produce a requirements table covering a defined range of possible workloads of the primary application, and compares the measured performance for each device against the requirements table to produce a performance score that provides the indication of whether or not a required read/write performance of the primary application is satisfied.

16. The apparatus of claim 15 further comprising:
a first graphical user interface (GUI) component expressing the performance score as a percentage score in the range of 0 to 100 percent and assigning a color code to defined sub-ranges in the range; and
a second GUI component displaying the performance score as at least one of a numeric percentage and the color code to a user through a display monitor, wherein the color code comprises a green display for a range of 90 to 100 percent, a yellow display for a range of 70 to 90 percent, and a red display for a range of 0 to 70 percent.

17. The apparatus of claim 15 wherein the requirements table comprises a number n of latency tables each having a unique mix of read/write operations, wherein each table comprises a number of cells, wherein a row of a cell is selected by average throughput and a column of the cell is selected by average transfer block size, and value in the cell represents a target latency in a unit of time.

18. The apparatus of claim 17 wherein the primary application comprises a deduplication backup process executed by a server computer in the network, and which comprises a deduplication backup server running a Data Domain file system (DDFS).

19. A computer program product, comprising a non-transitory computer-readable medium having a computer-readable program code embodied therein, the computer-readable program code adapted to be executed by one or more processors to implement a method of measuring performance of an application running in a virtual computer network by:
   receiving, for each device of a plurality of devices in the network, an existing flow of device operating parameters;
   measuring a performance for each device and the network as a whole over a plurality of durations for a specified time period in terms of the device operating parameters;
   analyzing a workload of a primary application of a target device of the plurality of devices in terms of data transfer variables of the primary application to determine an envelope of I/O (input/output) requirements of the primary application, wherein the envelope is expressed as a three-dimensional set of n tables; and
   producing a summary performance score for each device using measured performance and the envelope of I/O requirements to provide an indication of whether or not a required read/write performance of the primary application is satisfied, wherein the performance score is calculated using data variables comprising device throughput, input/output operations (IOPS), device latency, slow I/O counts exceeding one second, average block size, and read-to-write ratio.

20. The computer program product of claim 19, the average block size is calculated by dividing the device throughput by the IOPS, and the read-to-write ratio is calculated by dividing a read throughput by a combined read and write throughput, and wherein the envelope of I/O requirements is a table in the set of n tables that lists, for a given average transfer size and throughput level, an expected latency in microsecond.

* * * * *